(12) United States Patent
Tillotson

(10) Patent No.: US 11,358,740 B2
(45) Date of Patent: Jun. 14, 2022

(54) MAGNETIC MANEUVERING FOR SATELLITES

(71) Applicant: The Boeing Company, Chicago, IL (US)

(72) Inventor: Brian Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 254 days.

(21) Appl. No.: 16/565,289

(22) Filed: Sep. 9, 2019

(65) Prior Publication Data

US 2021/0070478 A1 Mar. 11, 2021

(51) Int. Cl.
*B64G 1/24* (2006.01)

(52) U.S. Cl.
CPC .................... *B64G 1/242* (2013.01)

(58) Field of Classification Search
CPC ...... B64G 1/1085; B64G 1/1078; B64G 1/24; B64G 1/242; B64G 1/244; B64G 1/646
USPC .................................................. 244/164, 166
See application file for complete search history.

(56) References Cited

U.S. PATENT DOCUMENTS

| | | | | |
|---|---|---|---|---|
| 2,894,747 A * | 7/1959 | Seymour | ............... | A63F 7/3622 273/118 A |
| 3,260,475 A * | 7/1966 | Ormsby | ................... | B64G 1/32 244/166 |
| 3,381,171 A * | 4/1968 | Kienast | .................. | H05B 7/005 315/176 |
| 3,429,524 A * | 2/1969 | Buckingham | .......... | B64G 1/366 244/166 |
| 6,089,510 A * | 7/2000 | Villani | ................... | B64G 1/244 244/166 |
| 6,356,814 B1 * | 3/2002 | Koenigsmann | .......... | B64G 1/32 701/13 |
| 8,205,838 B2 * | 6/2012 | Moorer, Jr. | ............ | B64G 1/007 244/158.6 |
| 9,846,023 B1 * | 12/2017 | Soloway | ................ | G01B 7/003 |
| 2003/0098394 A1 * | 5/2003 | Cooper | ................. | B64G 1/646 244/166 |
| 2005/0248491 A1 * | 11/2005 | Leyre | ....................... | B64G 1/66 343/702 |
| 2005/0257515 A1 * | 11/2005 | Song | ....................... | B05B 5/008 60/202 |
| 2006/0091262 A1 * | 5/2006 | Belisle | ................... | B64G 1/409 244/166 |
| 2007/0295865 A1 * | 12/2007 | Maini | ...................... | B64G 1/32 244/166 |

(Continued)

*Primary Examiner* — Brady W Frazier
(74) *Attorney, Agent, or Firm* — Haynes and Boone, LLP

(57) ABSTRACT

Systems, methods, and apparatus for magnetic maneuvering for satellites are disclosed. In one or more embodiments, a method for maneuvering satellites comprises applying, by a current source in a first satellite, current to an electromagnet in the first satellite. The method further comprises generating, by the electromagnet in the first satellite in response to the current, a magnetic field. Further, the method comprises maneuvering, by the first satellite, a second satellite via the magnetic field. In one or more embodiments, the electromagnet comprises a torque rod, an electric motor coil, and/or a solar array. In one or more embodiments, the second satellite comprises a ferromagnetic or ferrimagnetic material, a conductive material, or a combination thereof. In some embodiments, the second satellite comprises an electromagnet.

20 Claims, 8 Drawing Sheets

(56) References Cited

U.S. PATENT DOCUMENTS

| | | | |
|---|---|---|---|
| 2010/0321011 A1* | 12/2010 | Small | B64D 39/04 |
| | | | 324/239 |
| 2011/0036951 A1* | 2/2011 | Moorer | B64G 1/646 |
| | | | 244/158.6 |
| 2011/0260722 A1* | 10/2011 | Renault | B64G 1/105 |
| | | | 324/244 |
| 2012/0012711 A1 | 1/2012 | Ross | |
| 2016/0004250 A1* | 1/2016 | Pan | B64G 1/10 |
| | | | 244/166 |
| 2018/0170581 A1* | 6/2018 | Zhang | B64G 1/283 |

\* cited by examiner

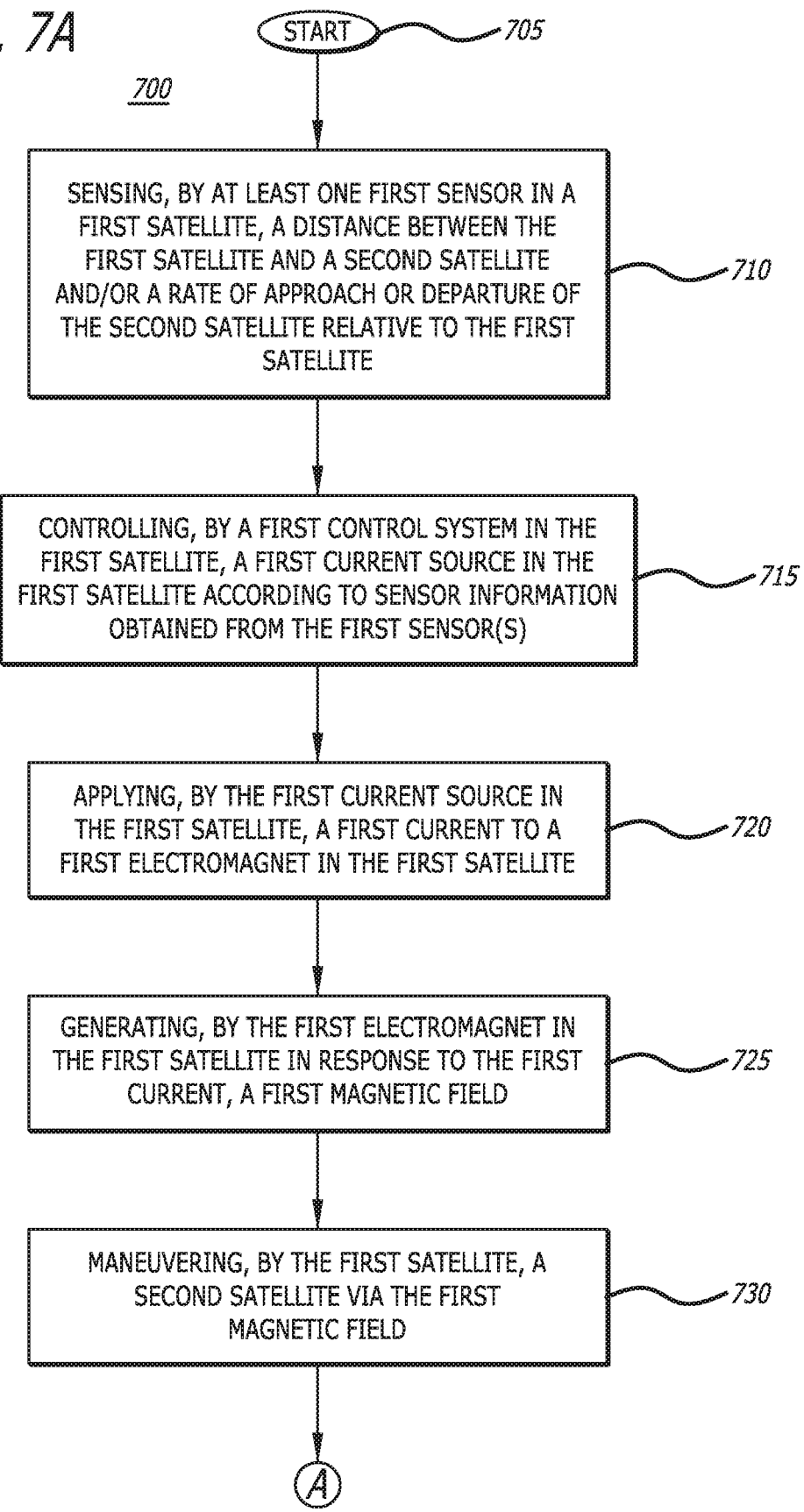

MAGNETIC MANEUVERING FOR SATELLITES

FIELD

The present disclosure relates to maneuvering of satellites. In particular, the present disclosure relates to magnetic maneuvering for satellites.

BACKGROUND

Spacecraft (e.g., satellites) often need to maneuver close to each other, and in some cases, exert force on each other to change their orbits or orientations. In some cases, there is a need for close-up maneuvers or force even when one spacecraft is out of control, or when one or both are too fragile for mechanical contact. Ideally, the maneuvers expend no propellant.

Currently, nano-satellites and micro-satellites comprise an increasing share of the space market. Sometimes these satellites need to act in concert (e.g., to collectively form an antenna with larger aperture than one satellite can provide). Sometimes there is a constraint to launch a payload as several small pieces that can together form a larger satellite, where the pieces are launched in separate compartments of a launch adapter and then assemble themselves together in space. Also, there is sometimes a need to rescue or de-orbit satellites that are damaged, dead, or in incorrect orbits. Doing so requires one or more "rescue satellites" to maneuver in very close formation with the "target satellite" (e.g., to inspect it and determine whether the satellite can be recovered). In some cases, it may be desired that the rescue satellite exert force on the target satellite to change its orientation (e.g., pointing its solar arrays toward the sun) or its orbit. In some cases where the target satellite is very massive or must go through a large orbit change, several rescue satellites may be utilized in coordination together to deliver enough needed impulse to the target satellite.

Conventionally, rockets are utilized for these satellite maneuvers. A conventional rocket maneuvering system is heavy, has a finite lifetime, and imposes safety and environmental costs. In addition, rocket propellants are toxic, flammable, and/or stored at high pressure, where each of which poses risks and costs. In particular, rockets expend mass (e.g., consume propellant) and, as such, their total delta-v (i.e. change in velocity) for maneuvers is limited. Further, when spacecraft work close together, rocket plumes from one may impinge on others. This perturbs the others, thereby requiring further maneuvers which consume more propellant. Further, the rocket plumes may damage nearby spacecraft. The specific problem, then, is to allow several spacecraft to make relative maneuvers in close proximity, without limits on the total delta-v and without spraying nearby spacecraft with rocket plumes.

In light of the foregoing, there is a need for an improved technology for maneuvering spacecraft.

SUMMARY

The present disclosure relates to a method, system, and apparatus for magnetic maneuvering for satellites. In one or more embodiments, a method for maneuvering satellites comprising applying, by a current source in a first satellite, current to an electromagnet in the first satellite. The method further comprises generating, by the electromagnet in the first satellite in response to the current, a magnetic field. Further, the method comprises maneuvering, by the first satellite, a second satellite via the magnetic field.

In one or more embodiments, the first satellite is a rescue satellite, and the second satellite is a target satellite.

In at least one embodiment, the current source in the first satellite is a direct current (DC) source and/or an alternating current (AC) source. In some embodiments, the AC current source is a variable current source. In one or more embodiments, the current is DC current and/or AC current.

In one or more embodiments, the second satellite comprises a ferromagnetic or ferrimagnetic material, and the maneuvering of the second satellite comprises attracting the second satellite to the first satellite.

In at least one embodiment, the second satellite comprises a conductive material, and the maneuvering of the second satellite comprises repelling the second satellite away from the first satellite.

In one or more embodiments, the second satellite comprises a ferromagnetic or ferrimagnetic material and a conductive material, and the maneuvering comprises attracting the second satellite to the first satellite and/or repelling the second satellite away from the first satellite.

In at least one embodiment, the method further comprises controlling, by a control system in the first satellite, the current source in the first satellite. In some embodiments, the method further comprises sensing, by at least one sensor in the first satellite, a distance between the first satellite and the second satellite and/or a rate of approach or departure of the second satellite relative to the first satellite. In one or more embodiments, the control system controls the current source according to sensor information obtained from at least one sensor in the first satellite.

In one or more embodiments, the electromagnet comprises a torque rod, an electric motor coil, and/or a solar array.

In at least one embodiment, the second satellite comprises a second electromagnet.

In one or more embodiments, the method further comprises applying, by a second current source in the second satellite, a second current to the second electromagnet in the second satellite. Also, the method comprises generating, by the second electromagnet in the second satellite in response to the second current, a second magnetic field. Further, the method comprises maneuvering, by the second satellite, the first satellite via the second magnetic field.

In at least one embodiment, the first satellite and the second satellite operate with AC power at a same frequency or different frequencies. In some embodiments, the maneuvering of the second satellite and/or of the first satellite comprises attracting the second satellite to the first satellite, attracting the first satellite to the second satellite, repelling the second satellite away from the first satellite, repelling the first satellite away from the second satellite, inducing a relative motion between the first satellite and the second satellite, and/or inducing a constant relative orientation between the first satellite and the second satellite.

In one or more embodiments, a system for maneuvering satellites comprises a first satellite. In at least one embodiment, the first satellite comprises a current source to apply current to an electromagnet, and the electromagnet to generate a magnetic field in response to the current. Further, the system comprises a second satellite to be maneuvered by the first satellite via the magnetic field.

In at least one embodiment, the second satellite comprises a ferromagnetic or ferrimagnetic material, the second satellite is maneuvered by attracting the second satellite to the first satellite. In some embodiments, the second satellite comprises a conductive material, and the second satellite is maneuvered by repelling the second satellite away from the first satellite. In one or more embodiments, the second satellite comprises a ferromagnetic or ferrimagnetic material and a conductive material, and the second satellite is maneuvered by attracting the second satellite to the first satellite and/or repelling the second satellite away from the first satellite. In some embodiments, the second satellite comprises a second electromagnet.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

Figure 7B:
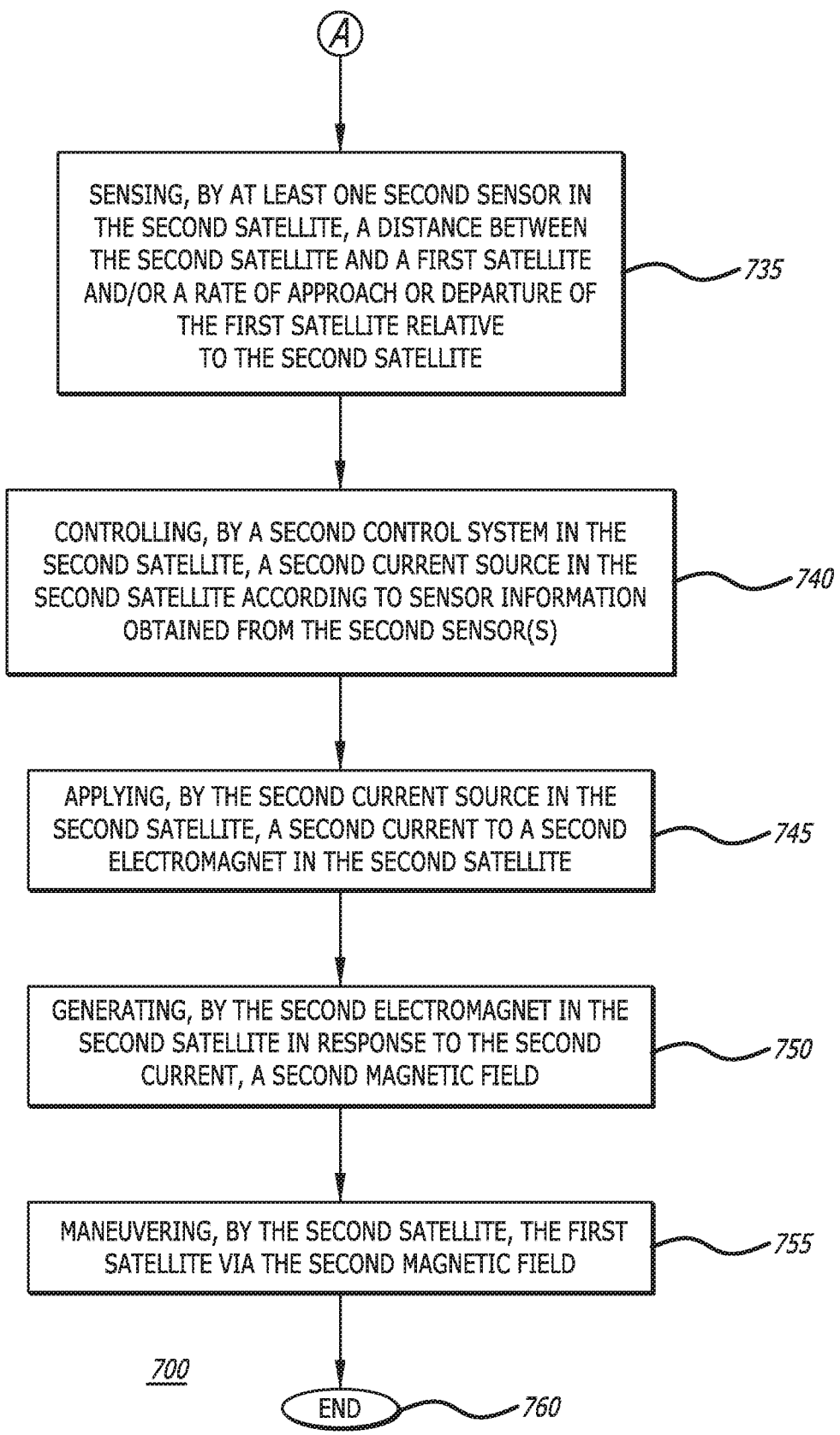

FIGS. 7A and 7B together are a flow chart showing the disclosed method for magnetic maneuvering of satellites, where a first satellite comprises a first electromagnet and a second satellite comprises a second electromagnet, in accordance with at least one embodiment of the present disclosure.

DESCRIPTION

The methods and apparatus disclosed herein provide an operative system for magnetic maneuvering for satellites. In one or more embodiments, the system of the present disclosure employs electromagnets to maneuver spacecraft (e.g., satellite(s)) near other spacecraft (e.g., satellite(s)). In some embodiments, the maneuvering spacecraft (e.g., a satellite) is the only spacecraft that employs an electromagnet. In other embodiments, electromagnets cycling at a common frequency produce forces and torques between nearby satellites, while electromagnets cycling at orthogonal frequencies produce no force or torque on other satellites. This allows numerous satellites in a small region to maneuver by relatively simple control laws.

As previously mentioned above, spacecraft (e.g., satellites) often need to maneuver close to each other, and in some cases, exert force on each other to change their orbits or orientations. In some cases, there is a need for close-up maneuvers or force even when one spacecraft is out of control, or when one or both are too fragile for mechanical contact. Ideally, the maneuvers expend no propellant.

Currently, nano-satellites and micro-satellites comprise an increasing share of the space market. Sometimes these satellites need to act in concert (e.g., to collectively form an antenna with larger aperture than one satellite can provide). Sometimes there is a constraint to launch a payload as several small pieces that can together form a larger satellite, where the pieces are launched in separate compartments of a launch adapter and then assemble themselves together in space. Also, there is sometimes a need to rescue or de-orbit satellites that are damaged, dead, or in incorrect orbits. Doing so requires one or more "rescue satellites" to maneuver in very close formation with the "target satellite" (e.g., to inspect it and determine whether the satellite can be recovered). In some cases, it may be desired that the rescue satellite exert force on the target satellite to change its orientation (e.g., pointing its solar arrays toward the sun) or its orbit. In some cases where the target satellite is very massive or must go through a large orbit change, several rescue satellites may be utilized in coordination together to deliver enough needed impulse to the target satellite.

Conventionally, rockets are typically utilized for these satellite maneuvers. A conventional rocket maneuvering system is heavy, has a finite lifetime, and imposes safety and environmental costs. In addition, rocket propellants are toxic, flammable, and/or stored at high pressure, where each of which poses risks and costs. In particular, rockets expend mass (e.g., consume propellant) and, as such, their total delta-v (i.e. change in velocity) for maneuvers is limited. Further, when spacecraft work close together, rocket plumes from one may impinge on others. This perturbs the others, thereby requiring further maneuvers which consume more propellant. Further, the rocket plumes may damage nearby spacecraft. The specific problem, then, is to allow several spacecraft to make relative maneuvers in close proximity, without limits on the total delta-v and without spraying nearby spacecraft with rocket plumes.

Compared to conventional rocket thrusters, the system of the present disclosure consumes no propellant and, as such, its delta-v for various maneuvers is unlimited. In addition, the disclosed system does not emit any substance that could damage other satellites. The disclosed system is not toxic or flammable, and does not use high pressure.

Another technique for maneuvering satellites is the use of an evolved expendable launch vehicle (EELV) secondary payload adaptor (ESPA) hinge that connects parts of a satellite. Each part of the satellite is launched on a separate port of a ESPA ring, which is a particular type of launch adapter. Each port of the ESPA ring can carry only a small load. As such, a satellite that is heavier than the capacity of a single port must be partitioned into parts (e.g., two parts). Each part of the satellite is mounted onto a separate port of the ESPA ring. A ESPA hinge is connected to the parts at their separated locations on the ESPA ring during lunch. On orbit, the parts are separated from the ports of the ESPA ring. The ESPA hinge then folds over, pressing the parts together to form a single large satellite. The disadvantages of using the ESPA hinge are that the ESPA hinge adds weight and the hinge does not allow for general maneuvering (e.g., the two parts cannot fly several meters away from each other and then return, nor can they circle to inspect each other). In addition, the ESPA hinge must be employed with an ESPA ring and, as such, the ESPA hinge cannot be employed for all types of launch systems.

Compared to the ESPA Hinge, the system of the present disclosure allows for a much wider range of maneuvers, allows for greater separation between spacecraft. In addition, the disclosed system can be launched on any type of launch vehicle.

Yet another technique for maneuvering satellites is the use of a tether connected to a reel. Pairs of spacecraft may be connected before flight by a flexible tether connected to a reel. On orbit, one of the spacecraft moves away from the other, thereby extending the tether. The tether constrains the spacecraft to remain within a fixed distance, often by many kilometers. The spacecraft must remain at least at the fixed distance apart because tension in the tether comes from the gravity gradient, and the gradient force is very weak at short distances. Spacecraft may maneuver by shortening the tether, which (if done properly) not only brings the spacecraft close together, but can cause them to revolve about each other. The drawbacks to using a tether connected to a reel are poor reliability, excess mass, inability to operate at a short distance, and the spacecraft must be connected to the tether before launch and, as such, there is no reasonable way to use a tether to connect a rescue satellite, for example, to a disabled satellite.

Compared to tethers, the system of the present disclosure operates much better at close distances. In addition, the disclosed system is likely to have higher reliability than the use of tethers. Additionally, the disclosed system does not require the spacecraft to be connected before launch, and does not require the spacecraft to be launched at the same time or on the same launch vehicle.

It should be noted that the use of each of these three conventional techniques (i.e. rocket thrusters, ESPA hinge, and tethers) for maneuvering satellites require additional mass on the satellite. Conversely, the disclosed system costs nearly no weight or volume.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to satellites, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

I. SYSTEMS FOR MANEUVERING SATELLITES

The system of the present disclosure, in the simplest form, utilizes methods to maneuver a first satellite very close to a second satellite. The second satellite may be uncooperative (e.g., dead or unresponsive) or cooperative (e.g., responsive to commands and has at least some control over its own behavior). Some embodiments of the present disclosure deal with more than two satellites.

In its most basic form, the disclosed system has the following elements: (1) a first satellite (e.g., a rescue satellite, which is denoted as "R" in FIGS. 1-4), which comprises at least one electromagnet (refer to 130 of FIGS. 1-3) that can be turned "on" and "off"; (2) a control system (refer to 170 of FIGS. 1-3) in communication with the electromagnet; and (3) a second satellite (e.g., a target satellite, which is denoted as "T" in FIGS. 1-4), where at least one portion of the second satellite experiences a force(s) in response to a magnetic field and/or magnetic field gradient.

A. First Embodiment—Ferromagnetic or Ferrimagnetic Material in Second Satellite

Figure 1:
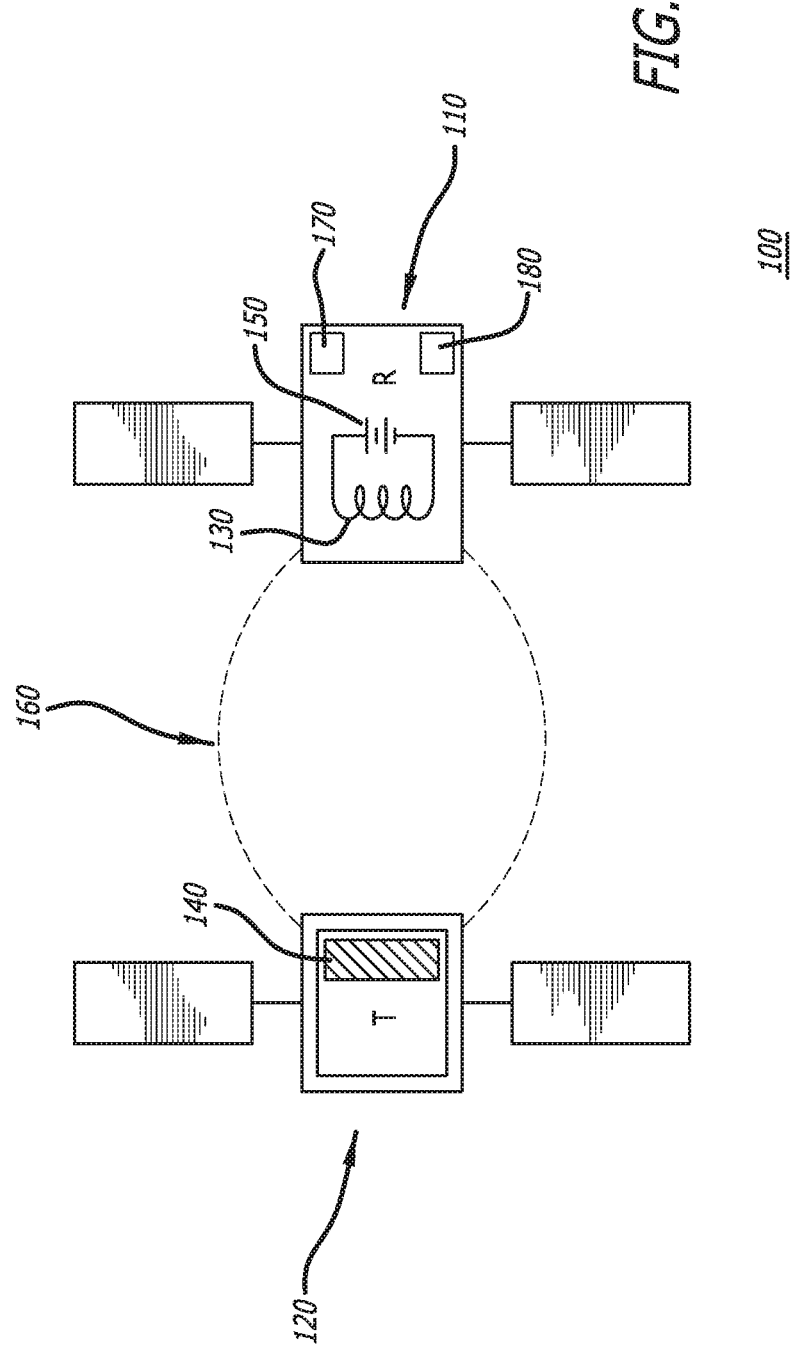
FIG. 1 is a diagram showing the disclosed system for magnetic maneuvering of satellites, where a first satellite comprises an electromagnet and a second satellite comprises a ferromagnetic or ferrimagnetic material (e.g., iron), in accordance with at least one embodiment of the present disclosure.

The simplest embodiment to provide a general explanation of the disclosed systems is where the second satellite comprises a block of ferromagnetic or ferrimagnetic material (e.g., iron). FIG. 1 is a diagram showing the disclosed system 100 for magnetic maneuvering of satellites, where a first satellite 110 comprises an electromagnet 130 (which is depicted as a coil) and a second satellite 120 comprises a ferromagnetic or ferrimagnetic material (e.g., iron) 140, in accordance with at least one embodiment of the present disclosure. It should be noted that various different types of electromagnets may be employed for the electromagnet 130 of the disclosed systems including, but not limited to, a torque rod (which may already be present on the satellite and, as such, adds no additional mass), an electric motor coil (as is shown in FIG. 1), and/or a solar array.

In this figure, the first satellite 110 is shown to comprise a control system 170, a sensor 180, a current source 150 (which is depicted as a direct current (DC) current source), and the electromagnet 130. The control system 170 is operable to control the current source 150 (e.g., control the operation of the current source 150). The sensor 180 is operable to sense the distance between the first satellite 110 and the second satellite 120 and/or sense the rate of approach or departure of the second satellite 120 relative to the first satellite 110. The control system 170 may control the current source 150 according to sensor information (e.g., the distance and/or rate of approach or departure) obtained by the sensor 180. The current source 150 is operable to apply current (e.g., a DC current) to the electromagnet 130.

When the control system 170 in the first satellite 110 turns "on" the electromagnet 130 (e.g., by controlling the current source 150 to apply current to the electromagnet 130), the electromagnet 130 produces a magnetic field 160, B(r). The magnetic field 160 induces a magnetic dipole, m(B), in the ferromagnetic or ferrimagnetic material (e.g., iron) 140. The magnitude of m(B) is typically a non-linear function of magnetic intensity. The magnetic dipole interacts with the magnetic field gradient, $\nabla B(r)$, to produce an attractive force, $F_B$, between the two satellites 110, 120 (e.g., for the maneuvering of the second satellite 120). It should be noted that the force is not strictly attractive; it may have some tangential components.

When the attractive force is no longer desirable, the control system 170 in the first satellite 110 turns "off" the electromagnet 130 (e.g., by controlling the current source 150 to not apply current to the electromagnet 130). The electromagnet 130 may be turned "on" with a steady current (direct current (DC)) or with an alternating current (AC). The attractive force is greatest with a DC field, but is typically strong enough to be useful with an AC field of low frequency. The magnetic field 160 can remain attractive at higher frequencies if the ferromagnetic or ferrimagnetic material (e.g., iron) is powdered or laminated to reduce the magnitude of eddy currents.

Uses for this embodiment include, but are not limited to, (a) keeping a satellite in the vicinity of a rocket stage from which it was deployed, (b) maneuvering a resupply satellite closer to a satellite that needs new equipment or fluids, (c) bringing a "tugboat" satellite into contact with a derelict that must be moved to another orbit, and (d) causing two satellites to revolve about their mutual center of mass, thereby changing the trajectory of both.

B. Second Embodiment—Conductive Material in Second Satellite

Figure 2:
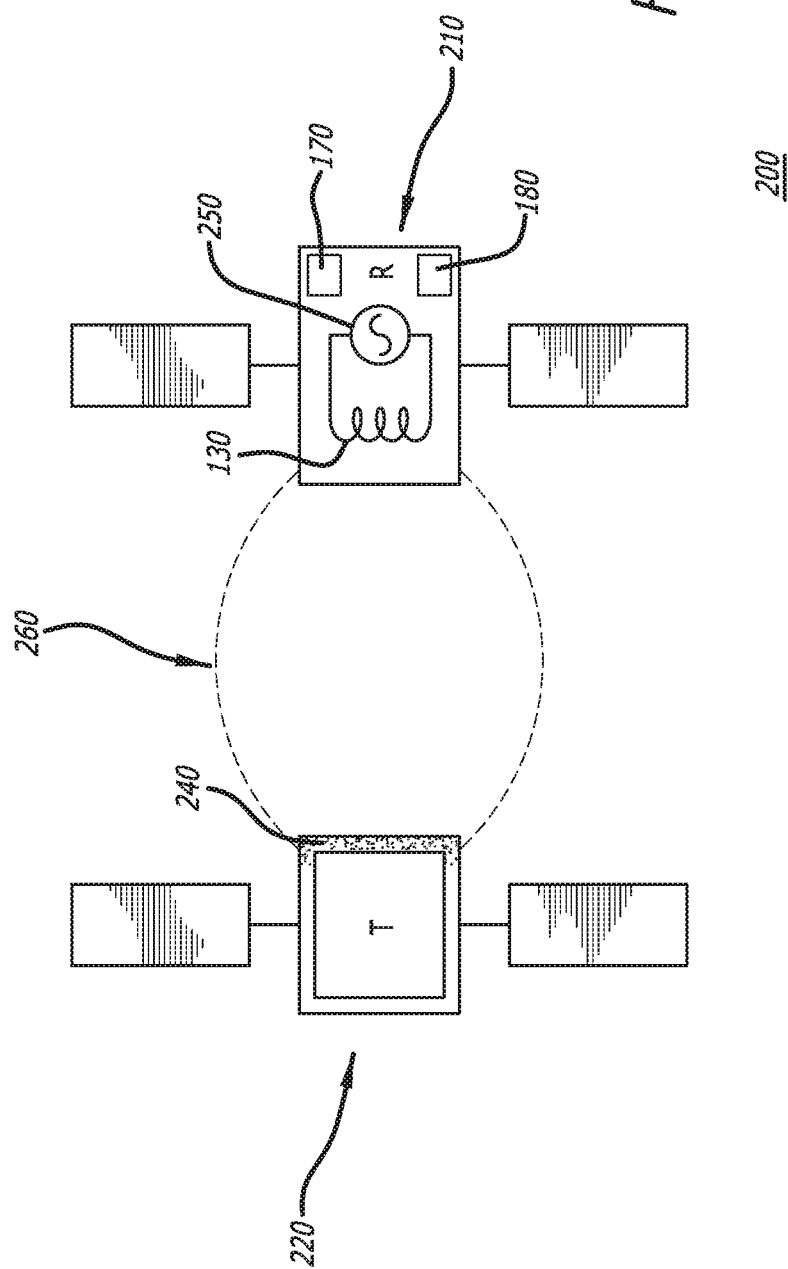
FIG. 2 is a diagram showing the disclosed system for magnetic maneuvering of satellites, where a first satellite comprises an electromagnet and a second satellite comprises a conductive material (e.g., aluminum), in accordance with at least one embodiment of the present disclosure.

In another embodiment, the second satellite comprises a section of electrically conductive material (e.g., a metal panel, a wire loop, or an array of photovoltaic cells). FIG. 2 is a diagram showing the disclosed system 200 for magnetic maneuvering of satellites, where a first satellite 210 comprises an electromagnet 130 and a second satellite 220 comprises a conductive material (e.g., aluminum) 240, in accordance with at least one embodiment of the present disclosure.

In this figure, the first satellite 210 is shown to comprise a control system 170, a sensor 180, a current source 250 (which is depicted as an AC current source), and the electromagnet 130. The control system 170 is operable to control the current source 250 (e.g., control the operation of the current source 250). The sensor 180 is operable to sense the distance between the first satellite 210 and the second satellite 220 and/or sense the rate of approach or departure of the second satellite 220 relative to the first satellite 210. The control system 170 may control the current source 250 according to sensor information obtained by the sensor 180. The current source 250 is operable to apply current (e.g., AC current) to the electromagnet 130.

In particular, the control system 170 in the first satellite 210 may turn the electromagnet 130 "on" and "off" at a selected AC frequency ($f_1$) (e.g., by controlling the current source 250 to apply or to not apply current to the electromagnet 130), or it may connect (or disconnect) the electromagnet 130 to an AC current source (e.g., current source 250) operating with a selected frequency ($f_1$). The electromagnet's 130 magnetic field 260, B(r, t), induces eddy currents in the conductive material 240. For a typical conductive material 240 and a typical AC waveform, the eddy currents interact with the magnetic field 260 to produce a repulsive force between the two satellites 210, 220. When the repulsive force is no longer desirable, the control system 170 in the first satellite 210 turns "off" the electromagnet 130.

Uses for this embodiment include, but are not limited to, (a) pushing a satellite away from a rocket stage from which it was deployed, (b) slowing the approach of a resupply satellite to a satellite that needs new equipment or fluids, and (c) exerting a push by a "tugboat" satellite on a derelict without mechanical contact between satellites.

C. Third Embodiment—Ferromagnetic or Ferrimagnetic Material and Conductive Material in Second Satellite The two embodiments discussed above may be combined. In a combined embodiment, the first satellite 310 is configured to operate its electromagnet 130 in both a DC and an AC mode. The second satellite 320 has both a block of ferromagnetic/ferrimagnetic material 140 and at least one segment of conductive material 240 (which may comprise a ferro/ferrimagnetic material).

Figure 3:
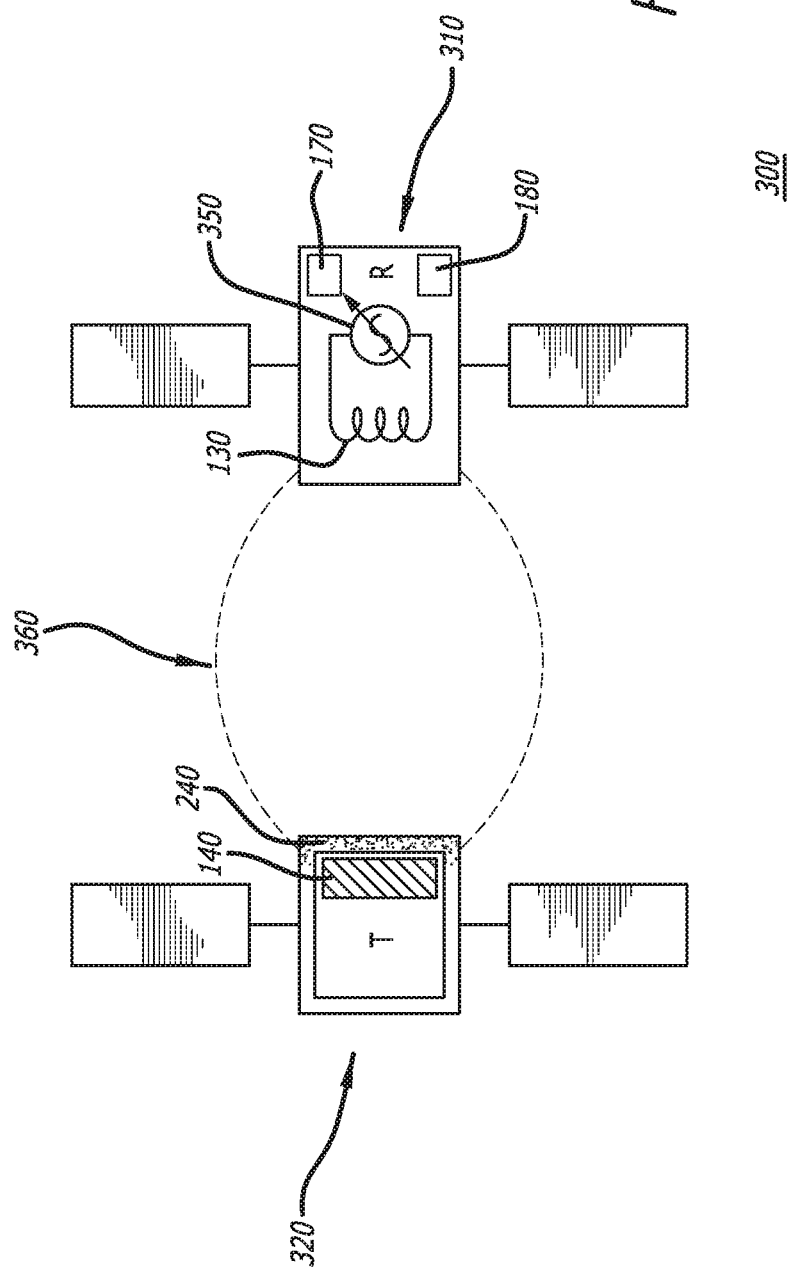
FIG. 3 is a diagram showing the disclosed system for magnetic maneuvering of satellites, where a first satellite comprises an electromagnet and a second satellite comprises a ferromagnetic or ferrimagnetic material as well as a conductive material, in accordance with at least one embodiment of the present disclosure.

FIG. 3 is a diagram showing the disclosed system 300 for magnetic maneuvering of satellites, where a first satellite 310 comprises an electromagnet 130 and a second satellite 320 comprises a ferromagnetic or ferrimagnetic material 140 as well as a conductive material 240, in accordance with at least one embodiment of the present disclosure.

In this figure, the first satellite 310 is shown to comprise a control system 170, a sensor 180, a current source 350 (which is depicted as a variable AC current source), and the electromagnet 130. The control system 170 is operable to control the current source 350 (e.g., control the operation of the current source 250). The sensor 180 is operable to sense the distance between the first satellite 310 and the second satellite 320 and/or sense the rate of approach or departure of the second satellite 320 relative to the first satellite 310. The control system 170 may control the current source 350 according to sensor information obtained by the sensor 180. The current source 350 is operable to apply current (e.g., AC current at a selected frequency ($f_1$)) to the electromagnet 130. The electromagnet 130, in response to the current, generates a magnetic field 360, which is used to maneuver the second satellite 320.

The repulsive force of eddy currents is roughly proportional to the frequency of the AC magnetic field 360. Thus, to attract the second satellite 320, the control system 170 in the first satellite 310 turns "on" the electromagnet 130 with a DC current (e.g., by controlling the current source 350 to apply DC current to the electromagnet 130), or a very low AC frequency (e.g., by controlling the current source 350 to apply low AC frequency current to the electromagnet 130). To repel the second satellite 320, the control system 170 in the first satellite 310 turns "on" the electromagnet 130 with a relatively high AC frequency (e.g., by controlling the current source 350 to apply high AC frequency current to the electromagnet 130). It should be noted that low AC frequency current has a lower frequency than high AC frequency current.

This embodiment allows the first satellite 310 to fully control its distance from (or its approach rate to) the second satellite 320 with only magnetic forces.

To enable the first satellite 310 to maintain a desired distance away from the second satellite 320, in one or more embodiments, the sensor 170 estimates the distance and/or approach rate between the satellites 310, 320, and reports this sensor information to the control system 170. The control system 170 is configured to control the current source 350 to switch to a lower AC frequency or DC to bring the satellites 310, 230 closer together or to increase the approach rate; and to control the current source 350 to switch to a higher AC frequency to move the satellites 310, 320 apart or to decrease the approach rate.

Various different types of distance sensors may be employed for the sensor 180 of the present disclosure. In some embodiments, the distance is estimated by magnetic effects like phase shifts, frequency shifts, and/or magnitude changes in the magnetic field 360 produced by the electromagnet 130.

D. Fourth Embodiment—Electromagnet in Second Satellite

Another embodiment is more complex, but produces stronger force, especially at long ranges, and is simpler for calculating numerical performance. In this embodiment, the second satellite comprises an electromagnet which, when turned "on", has a known magnetic dipole, m. The second satellite also comprises a control system to turn the electromagnet "on" or "off".

Figure 4:
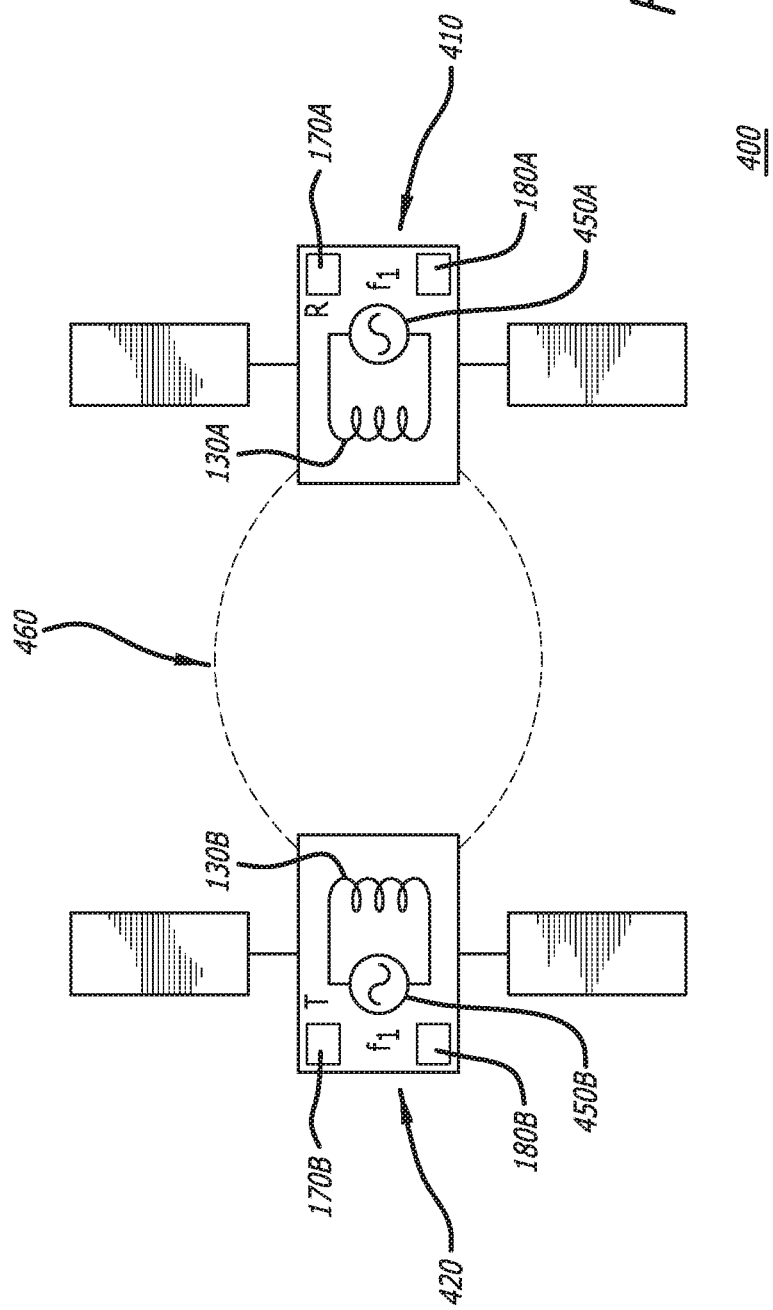
FIG. 4 is a diagram showing the disclosed system for magnetic maneuvering of satellites, where a first satellite comprises a first electromagnet and a second satellite comprises a second electromagnet, and the both satellites operate with AC power at the same frequency ($f_1$), in accordance with at least one embodiment of the present disclosure.

FIG. 4 is a diagram showing the disclosed system 400 for magnetic maneuvering of satellites, where a first satellite 410 comprises a first electromagnet 130A and a second satellite 420 comprises a second electromagnet 130B, and the both satellites 410, 420 operate with AC power at the same frequency ($f_1$), in accordance with at least one embodiment of the present disclosure.

In this figure, the first satellite 410 is shown to comprise a control system 170A, a sensor 180A, a current source 450A (which is depicted as an AC current source), and the electromagnet 130A. The control system 170A is operable to control the current source 450A (e.g., control the operation of the current source 450A). The sensor 180A is operable to sense the distance between the first satellite 410 and the second satellite 420 and/or sense the rate of approach or departure of the second satellite 420 relative to the first satellite 410. The control system 170A may control the current source 450A according to sensor information obtained by the sensor 180A. The current source 450A is operable to apply current (e.g., AC current at a specific frequency ($f_1$)) to the electromagnet 130A.

Similarly, the second satellite 420 is shown to comprise a control system 170B, a sensor 180B, a current source 450B (which is depicted as an AC current source), and the electromagnet 130B. The control system 170B is operable to control the current source 450B (e.g., control the operation of the current source 450B). The sensor 180B is operable to sense the distance between the first satellite 410 and the second satellite 420 and/or sense the rate of approach or departure of the first satellite 410 relative to the second satellite 420. The control system 170B may control the current source 450B according to sensor information obtained by the sensor 180B. The current source 450B is operable to apply current (e.g., AC current at a specific frequency ($f_1$)) to the electromagnet 130B.

In a simple method for operating this embodiment, the electromagnet 130A in the first satellite 410 and the electromagnet 130B in the second satellite 420 both operate with DC power, and therefore both produce DC magnetic fields 460. The benefits are (1) the magnetic dipole m is large even when the second satellite 420 is far enough from the first satellite 410 that the magnetic field 460 B(r) is weak, so the force is greater at longer distances than for the iron-only embodiment (i.e. the first embodiment), and (2) the magnetic dipole m is constant, so the force is easier to calculate and the maneuvers are simpler to conduct than for the embodiments comprising iron (i.e. the first and third embodiments), where m varies with distance and orientation.

Besides producing force, the magnetic dipole m in the second satellite 420 experiences a torque, $\tau(B)$, that tends to align the second satellite's 420 electromagnet 130B with the magnetic field 460 from the first satellite's 410 electromagnet 130A. (By conservation of momentum, the electromagnet 130A in the first satellite 410 experiences an equal and opposite torque.) This phenomenon can also be used to induce relative rotation between the satellites 410, 420, or to maintain a constant relative orientation between the satellites 410, 420.

1. AC Electromagnet in Second Satellite—Same Frequency

Referring to FIG. 4, in a more complex method to operate the two-electromagnet embodiment, the electromagnets 130A, 130B in the two satellites 410, 420 both operate with AC power at the same frequency, ft, and therefore both produce AC fields at the same frequency. The control systems 170A, 170B in the two satellites 410, 420 synchronize with each other, either by an absolute time reference or by exchange of some timing signal, so they not only match in frequency, but they are also aware of their relative phase.

When the two are in phase (i.e., when the magnetic field 460 from the first satellite 410 is substantially parallel to the magnetic dipole of the second satellite 420), the force produced is attractive. When the two are out of phase (i.e., when the magnetic field 460 from the first satellite 410 is substantially antiparallel to the magnetic dipole of the second satellite 420), the force produced is repulsive. Thus, an AC electromagnet 130B in the second satellite produces a relatively strong force at long ranges, with the force being switchable from attractive to repulsive, and with the force being relatively easy to calculate and with maneuvers, therefore, being relatively simple to conduct.

2. AC Electromagnet in Second Satellite—Orthogonal Frequencies

In another embodiment, the electromagnets in two satellites operate with AC power at different frequencies $f_1$ and $f_3$, and specifically at frequencies that are orthogonal. Here, orthogonal means the integral of magnetic force (or magnetic torque, in some embodiments) on dipole m is substantially zero over time intervals of more than a few cycles. For example, if the first satellite's electromagnet operates at 20 Hertz (Hz) and the second satellite's electromagnet operates at 30 Hz, the two frequencies are orthogonal over any interval longer than a few multiples of 0.1 second.

Figure 5:
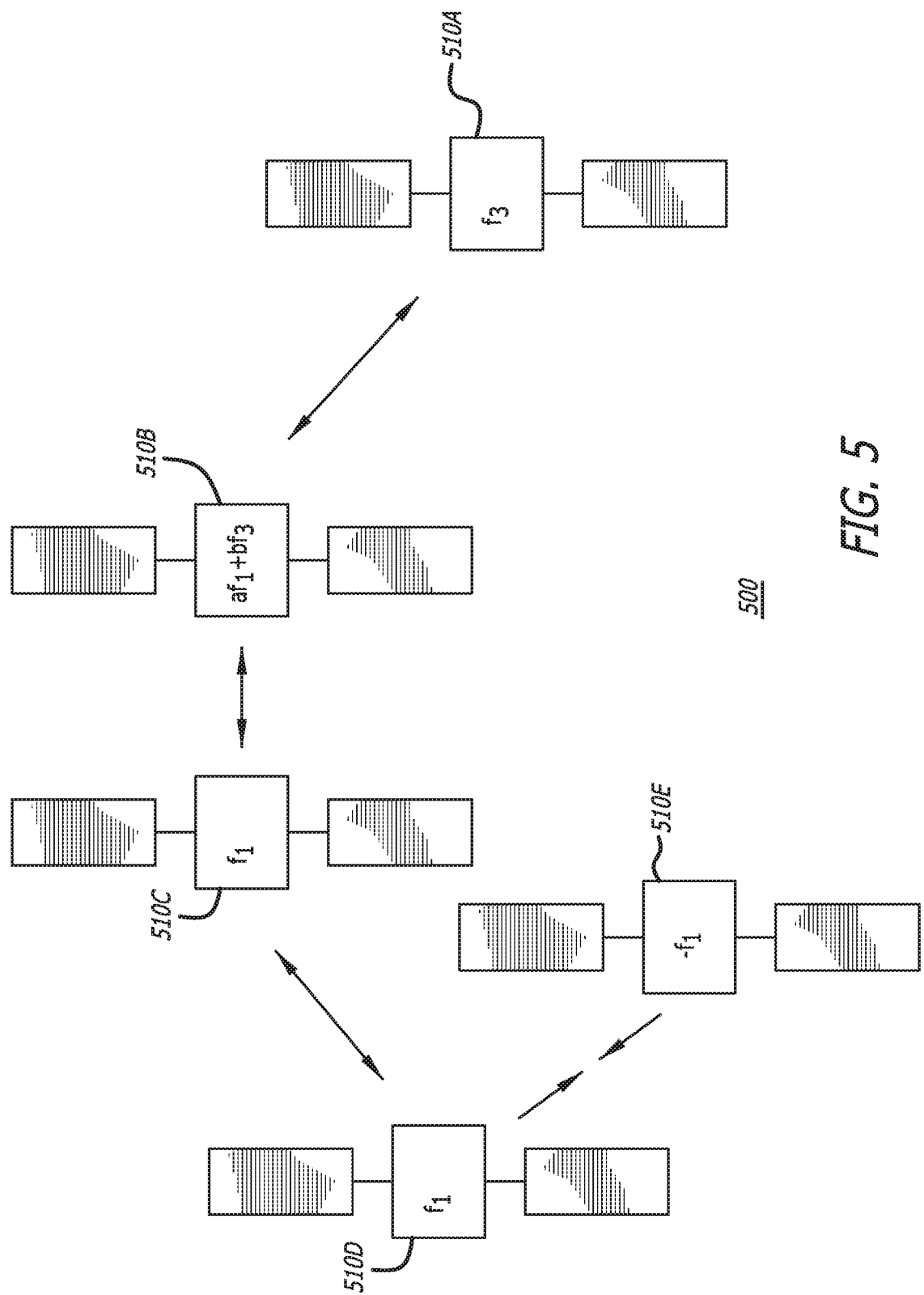
FIG. 5 is a diagram showing the disclosed system for magnetic maneuvering of satellites, where a plurality of satellites each comprises an electromagnet, and the satellites operate with AC power at different frequencies ($f_1$ and $f_3$) in accordance with at least one embodiment of the present disclosure.

At first, this seems useless because zero force between the two satellites can be easily achieved by simply turning off both electromagnets. But now consider the case of FIG. 5 where it is desirable to control the relative positions of five satellites, 510A-510E. FIG. 5 is a diagram showing the disclosed system 500 for magnetic maneuvering of satellites, where a plurality of satellites 510A-501E each comprises an electromagnet, and the satellites 510A-501E operate with AC power at different frequencies ($f_1$ and/or $f_3$) in accordance with at least one embodiment of the present disclosure. In this figure, satellites 510C and 510D both operate with AC power at frequency $f_1$, satellite 510E operations with AC power at frequency $-f_1$ (i.e. frequency $f_1$ but 180 degrees out of phase with 510C and 510D), satellite 510A operates with AC power at frequency $f_3$, and satellite 510B operates with AC power at frequencies $f_1$ and $f_3$. Satellites 510B, 510C, 510D, and 510E may interact with each other while operating with AC power at frequency f1, and satellites 510A and 510B may interact with each other while operating with AC power at frequency f3.

Let us suppose that satellite 510A needs to move closer to satellite 510B. Naïvely, we would turn "on" the electromagnets on satellites 510A and 510B, align their cycles to be in phase, and the two satellites 510A, 510B would move closer together. However, if satellite 510B needs to maintain its distance from satellite 510C, while satellite 510A needs to exert no force on satellite 510C, the same frequency cannot be used by all three satellites. If so, satellite 510A will attract or repel satellite 510C.

The solution, as shown in 5, is for satellite 510A to operate with AC power at frequency $f_3$, 510C to operate with AC power at frequency $f_1$, and for the control system in satellite 510B to drive its electromagnet with AC power having a linear combination of frequencies $f_1$ and $f_3$ with magnitude a for the $f_1$ component and magnitude b for the $f_3$ component. (In the alternative, satellite 510B can switch back and forth between frequencies, thereby spending a short time operating at frequency $f_1$, then a short time operating at frequency $f_3$, and then repeating.) The interaction through operating at frequency $f_1$ helps satellites 510B and 510C maintain their distance from one another. The interaction through frequency $f_3$ helps satellite 510A move closer to satellite 510B. And because frequencies $f_1$ and $f_3$ are orthogonal, satellites 510A and 510C exert no force on each other.

The use of orthogonal frequencies allows for multiple satellites to operate in close proximity, and yet have easily-controlled pairwise interactions. Without employing orthogonal frequencies, every satellite would constantly jostle every other satellite.

A similar embodiment uses orthogonal frequencies in conjunction with eddy currents. To maneuver multiple rescue satellites near a single target satellite, there needs to be a way for the rescue satellites to repel the target satellite so they can change the target satellite's orbit without touching it, but to not interfere with each other. The method for this scenario comprises the following four steps. In the first step, rescue satellite A approaches the target satellite at a low speed using conventional methods. Its control system turns its electromagnet rapidly "on" and "off" at frequency A to generate an AC magnetic field at the same frequency. In the second step, rescue satellite B approaches the target satellite using conventional methods. Its control system turns its electromagnet rapidly "on" and "off" at frequency B (which is orthogonal to frequency A) to generate an AC magnetic field at that frequency. In the third step, the AC magnetic field of each rescue satellites A and B produces eddy currents in the target satellite. The eddy currents interact with the magnetic field, thereby pushing the target satellite away from each of the rescue satellites A and B. In the fourth step, because the AC magnetic fields of the two satellites have orthogonal frequencies, their net effect on each other is zero. This is true even with a large number of satellites, so long as all have mutually orthogonal frequencies. (More subtly, the frequencies, phases, and orientations of the magnetic fields can be adjusted so that the satellites repel or attract each other as desired.)

Force has been discussed above. However, it is often useful to apply torque (e.g., to control the orientation of the satellite with respect to another satellite). Most of the examples and embodiments described above produce some torque as well as force, in accordance with well-known laws of electromagnetism and mechanics. In some embodiments, the disclosed systems employ these torques to control a satellite's orientation or rotation, in addition to using magnetic force to control the satellite's location or translation.

II. METHODS FOR MANEUVERING SATELLITES

Figure 6:
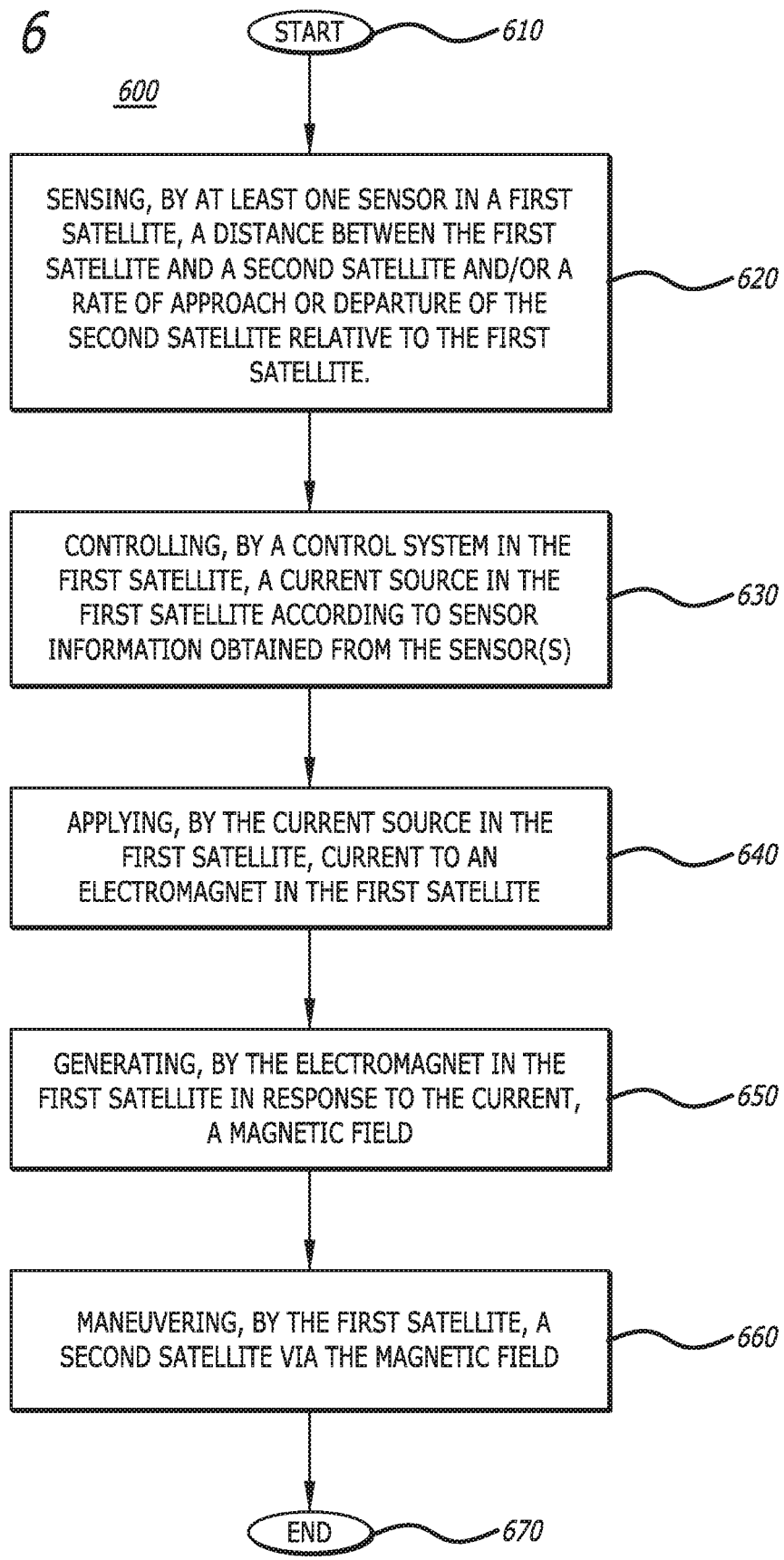
FIG. 6 is a flow chart showing the disclosed method for magnetic maneuvering of satellites, where a first satellite comprises an electromagnet, in accordance with at least one embodiment of the present disclosure.

FIG. 6 is a flow chart showing the disclosed method 600 for magnetic maneuvering of satellites, where a first satellite comprises an electromagnet, in accordance with at least one embodiment of the present disclosure. At the start 610 of the method 600, at least one sensor in a first satellite senses a distance between the first satellite and a second satellite and/or a rate of approach or departure of the second satellite relative to the first satellite 620. Then, a control system in the first satellite controls a current source in the first satellite according to sensor information obtained by the sensor(s) 630. The current source then applies current to an electromagnet in the first satellite 640. The electromagnet in the first satellite, in response to the current, generates a magnetic field 650. The second satellite is maneuvered via the magnetic field 660. Then, the method 600 ends 670.

FIGS. 7A and 7B together are a flow chart showing the disclosed method 700 for magnetic maneuvering of satellites, where a first satellite comprises a first electromagnet and a second satellite comprises a second electromagnet, in accordance with at least one embodiment of the present disclosure. At the start 705 of the method 700, at least one first sensor in a first satellite senses a distance between the first satellite and a second satellite and/or a rate of approach or departure of the second satellite relative to the first satellite 710. Then, a first control system in the first satellite controls a first current source in the first satellite according to sensor information obtained by the first sensor(s) 715. The first current source in the first satellite then applies a first current to a first electromagnet in the first satellite 720. The first electromagnet in the first satellite, in response to the first current, generates a first magnetic field 725. The second satellite is maneuvered via the first magnetic field 730.

At least one second sensor in a second satellite senses a distance between the second satellite and the first satellite and/or a rate of approach or departure of the first satellite relative to the second satellite 735. Then, a second control system in the second satellite controls a second current source in the second satellite according to sensor information obtained by the second sensor(s) 740. The second current source in the second satellite then applies a second current to a second electromagnet in the second satellite 745. The second electromagnet in the second satellite, in response to the second current, generates a second magnetic field 750. The first satellite is maneuvered via the second magnetic field 755. Then, the method 700 ends 760.

III. TECHNICAL BACKGROUND

This section describes the magnetic fields produced by electromagnets, such as satellite torque rods (e.g., simple dipoles) and the forces between them. Simple geometries and approximations are first presented, and then more complicated cases are discussed.

A. Direct Current (DC) Magnetic Dipoles

Equation (1) describes the magnetic field B produced by a magnet with magnetic moment m in spherical coordinates, when the magnetic moment is aligned with the coordinate axis.

$$B(r) = \frac{\mu_0}{4\pi} \frac{|m|}{|r|^3} (2\cos\theta\,\hat{r} + \sin\theta\,\hat{\theta}) \quad (1)$$

Boldface text denotes vector quantities. The field diminishes with the radius cubed, and is twice as strong on the magnetic axis as at the equator:

$$B_{axis} = \frac{\mu_0 m}{2\pi r^3} \quad (2)$$

$$B_{equator} = \frac{\mu_0 m}{4\pi r^3} \quad (3)$$

Force on a magnetic dipole $m_1$ in the magnetic field $B_2$ of a second dipole $m_2$ is shown in equation (4):

$$F = \nabla(m_1 \cdot B_2). \quad (4)$$

The force is attractive (i.e. it points opposite to the unit vector $\hat{r}$) when $m_1 \cdot B_2$ is positive and repulsive when it is negative. By conservation of momentum, the force on dipole $m_2$ is equal in magnitude and opposite in direction. The force is zero when the dot product is zero, i.e., when $m_1$ is perpendicular to $B_2$.

For now, let us consider only the radial variation of magnetic intensity, i.e., $1/r^3$. The gradient of the field is thus $-1/r^4$, so the force on dipole $m_1$ is also proportional to $-1/r^4$.

$$F \cong 1/r^4. \quad (5)$$

Equation (5) is only an approximation, but it gives a useful sense of how force scales with distance between two magnets, i.e., two dipoles.

This case applies when a rescue satellite approaches a target satellite that is cooperative and has an active magnetic dipole, such as a torque rod or other electromagnet.

B. Ferromagnetic Dipoles

The discussion above assumes the magnetic moment m of a dipole is constant. That is true for a DC electromagnet, but not true for a typical piece of iron or other ferromagnetic or ferrimagnetic material. For those, the magnetic moment is a function of the external magnetic field. That function is generally nonlinear. Sometimes it is not even a function; it may depend on the history the external field. However, for a weak field and for the type of material typically used in a satellite torque rod, the magnetic moment is approximately linear with the external magnetic field. That is:

$$m = \mu B_2 \quad (6)$$

where μ is the magnetic permeability. The strength of the field $B_2$ typically is proportional to $1/r^3$, so m goes as $1/r^3$. The gradient of the field is proportional to $1/r^4$. Since the force on the dipole is proportional to the dipole strength times the field gradient, as in equation (4), the force on a ferromagnetic dipole is roughly proportional to $1/r^7$. This is quite weak at even moderate distance, and is very sensitive to distance at close range. (The close-range sensitivity is somewhat moderated by saturation: once the iron is fully saturated, the dipole does not increase much even when the field becomes very strong.)

C. Eddy Currents with Direct Current (DC) Dipole

Let us assume the target satellite has no iron or electromagnet, but it has at least one loop or sheet of electrical conductor (e.g., metallic skin, current loops through photovoltaic arrays, etc.). When a rescue satellite approaches with its magnetic dipole $m_2$ turned on, producing magnetic field $B_2$, the magnetic flux through the conductive loop or sheet will change. By Friday's law of induction:

$$E_1 = -d\Phi_B/dt \quad (7)$$

The change in magnetic flux $\Phi_B$ causes an electromotive force $E_1$. In a conductive material, this electromagnetic force induces an eddy current. Calculating eddy currents is complicated, but $E_1$ is loosely proportional to the radial derivative of $B_2$ times the rescue satellite's approach speed $v_{21}$:

$$E1 \cong -dB_2/dr\, v_{21}. \quad (8)$$

The eddy currents act as an electromagnet with AC dipole m. This dipole reacts against the magnetic field $B_2$, producing a mutual force between the satellites. This force will almost always be repulsive, and it may also induce torque on the satellites.

Thus, even a simple DC magnetic field produced by the rescue satellite produces at least some retarding force to slow its approach.

The eddy current also produces a measurable magnetic field (in addition to the deceleration) by which the rescue satellite can estimate its distance to the target satellite.

D. Alternating Current (AC) Magnetic Dipoles

Now let us assume the rescue satellite is producing an AC magnetic field, either by turning a DC electromagnet "on" and "off" or by connecting the electromagnet to an AC power supply. The magnetic field $B_2$ oscillates with some frequency $f_2$.

If the target satellite has no electromagnet or iron, but it has a conductive segment, then the oscillating field $B_2$ from the rescue satellite induces eddy currents in the target satellite, even when the relative velocity is zero.

Strength and spatial distribution of eddy currents depend on the material and configuration of the target satellite and on the frequency, orientation, and distribution of the magnetic field. Some basic principles are: (1) skin depth and (2) contiguous conductor size.

1. Skin Depth

Eddy currents create internal magnetic fields that oppose changes in the external magnetic field, $B_2$. Thus, eddy currents are strongest at the surface, where they oppose penetration by the external field. For relatively low frequencies, density of eddy currents dies off in accordance with equation (9):

$$J(d) = J_0 \exp\left(\frac{-d}{\delta}\right) \quad (9)$$

where d is in depth below the surface and δ is skin depth, given by equation (10)

$$\delta = \sqrt{\frac{2\rho}{\omega\mu}} \quad (10)$$

in which ρ is resistivity, ω is angular frequency (equal to $2\pi f_2$), and μ is the product of the relative magnetic permeability $\mu_r$ of the conductor and the permeability $\mu_0$ of free space. (Permeability may be greater than 1000 in ferromagnetic material, so skin depth is quite shallow in contiguous chunks of ferromagnetic metal unless the frequency is very low.)

2. Contiguous Conductor Size

A large block of conductive material produces a large eddy current. The same volume of material, cut into thin slices that are insulated from each other, produces much less eddy current—assuming the magnetic field is parallel to the slices. (This is the reason for laminated cores in electrical transformers as they reduce eddy currents.)

These two factors, (1) skin depth and (2) contiguous conductor size, can be used in various ways. When the configuration of a target satellite is known, electromagnetic modeling software can be used to choose orientation and frequency of the rescue satellite's magnetic field to reach selected parts of the target satellite more than others.

Notably, if there is a block of iron or a torque rod somewhere in the target satellite, DC or a very low frequency can be used to penetrate the skin and the iron core, thereby attracting the satellite in accordance with equation (4). Then switching to a high frequency (and/or orient the field perpendicular to the laminations in the core) can be performed so the skin depth is shallow and there is little penetration of the iron core. The result is a small induced AC dipole in the iron, so the attractive force is small, while the eddy currents produce a large opposing dipole with a large repulsive force. The result is repulsion of the satellite.

IV. NUMERICAL EXAMPLES

Below are some quantitative examples.

A. Force

Differentiating equation (2), the gradient of the axial magnetic field is given by:

$$\nabla B_{axis} = \frac{-3\mu_0 m}{2\pi r^4} \quad (11)$$

Incorporating this in equation (4), we see the force between two parallel magnets with moments $m_1$ and $m_2$, aligned on each other's axes, is $$F_{axial} = \frac{-3\mu_0 m_1 m_2}{2\pi r^4}. \quad (12)$$

As an example value for $m_1$ and $m_2$, we consider a torque rod used on Johns Hopkins University Applied Physics Lab's MSX satellite. That torque rod is 0.9 meters long, 2.5 centimeters in diameter, weighs 2.7 pounds (i.e., about 1 kilogram (kg)), and produces a magnetic moment m of 100 Ampere-square meter (A-m²). Using 100 A-m² as our value, the force between two satellites, in meter, kilogram, second (MKS) units, is $$F_{axial} = \frac{(-3)4\pi \times 10^{-7} \times 100 \times 100}{2\pi r^4} \quad (13)$$

The dominant perturbation to overcome in orbit is usually the gravity gradient. For two satellites with the same mass separated in altitude by distance h, the gravity gradient force on each is:

$$F_{grav} = \text{mass } g'h/2 \quad (14)$$

where g' is the gravity gradient. For the magnetic maneuvering system to be economically useful, it should comprise no more than about 1/100 of the mass of its satellite. Since our exemplary torque rod has mass ~1 kg, we set the satellite mass ~100 kg.

To see at what range the magnetic force can exceed the gravity gradient force, we set range r=h, the altitude difference, and we write:

$$F_{axial} > F_{grav} \quad (15)$$

so $$\frac{(-3)4\pi \times 10^{-7} \times 100 \times 100}{2\pi r^4} > 100 \, g'r/2. \quad (16)$$

In Low Earth Orbit (LEO), the gravity gradient g'~1.54× $10^{-6}$ Newton/kilogram/meter (N/kg/m). Solving equation (16) with that value of g', we find r<4.27 meters. This is adequate distance to handle maneuvers near an ESPA ring or other launch adapter; near a spacecraft to be inspected like the International Space Station (ISS) or a translunar cargo vehicle; for creating a distributed aperture; or for inspecting, pushing, or orienting a disabled satellite.

At Geosynchronous Earth Orbit (GEO), the gravity gradient g'~10.6×$10^{-9}$ N/kg/m. Solving equation (16) with that value of g', we find r<22.5 meters. This is adequate distance to handle the maneuvers above with even larger distributed apertures or with safer standoff distance while inspecting a disabled satellite.

B. Torque

Torque on a dipole is given by:

$$\tau = m \times B \quad (17)$$

where $\tau$ is torque and × indicates a cross product. Choosing 3 meters (10 feet) as a nominal distance between satellites and 100 A-m² as the nominal magnetic dipole, $$B_{axis} = \frac{\mu_0 m}{2\pi r^3} \quad (18)$$
$$= 4\pi 10^{-7} \times 100/(2\pi \, 3^3)$$
$$= 0.741 \times 10^{-6} \, T.$$

At GEO, the Earth's magnetic field is about 0.05×$10^{-6}$ T. The spacecraft's magnetic field is more than an order of magnitude stronger than the Earth's magnetic field, so DC magnetic torque is useful to provide relative orientation for two spacecraft at GEO equipped with typical torque rods.

At LEO, the Earth's magnetic field is a thousand times stronger than at GEO, and is tens to hundreds of times stronger than the magnetic field a few meters from a typical spacecraft. Thus, DC torque between two satellites is minor compared to the Earth's effect at LEO; a spacecraft with its torque rod turned on will orient to the Earth's magnetic field rather than to the other spacecraft.

To solve this problem, some embodiments use AC electromagnets synchronized among the spacecraft. The AC dipoles incur zero average torque from Earth's DC field, but exert a useful average torque between the satellites. (As with force, matched frequencies and orthogonal frequencies allow one pair of spacecraft to exert torque on each other while exerting zero average torque on other spacecraft nearby.)

V. ALTERNATIVE EMBODIMENTS

A. Multiple Electromagnets in a Single Satellite

In some embodiments, as mentioned above, the electromagnet is a torque rod, an electric motor coil, or a solar cell array configured to form a large magnetic dipole. It should be noted that prior art solar arrays are generally configured so that the electric current within them produces little or no magnetic dipole.

The discussion thus far only described a single electromagnet per satellite. However, it should be noted that some embodiments may employ multiple electromagnets in a single satellite. These electromagnets may be oriented in parallel with each other to achieve a larger magnetic dipole moment. In some embodiments, the electromagnets may be oriented orthogonal to each other to produce magnetic dipoles at different orientations, which may be useful for orienting one satellite relative to another or for maneuvering relative to two or more other satellites that have different magnetic orientations.

In addition, it should be noted that the electromagnet(s) may have a fixed orientation within the satellite. Or, conversely, the electromagnet(s) may be mounted on a gimbal within the satellite. A controller and actuators may be employed to control the gimbal to orient the electromagnet(s) at different angles to better control force or torque relative to another satellite.

B. Sensing Distance Magnetically

In some embodiments, distance may be determined magnetically. If the first satellite creates an AC magnetic field, eddy currents in the second satellite can reveal proximity to the target. In some embodiments, these eddy currents may be used to measure distance to the target. The presence of eddy currents can be deduced by a small shift in frequency of an AC magnetic oscillator on the satellite, by a shift in the Q-value of the oscillator producing the AC, or by a change in the magnitude of the AC field. These and other techniques are well-established in metal detectors, which use an AC field to detect hidden pieces of conductive material.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

I claim:

1. A method for maneuvering satellites, the method comprising:
   applying, by a current source in a first satellite, current to an electromagnet in the first satellite;
   generating, by the electromagnet in the first satellite in response to the current, a magnetic field;
   controlling, by a control system in the first satellite, the current source to switch between direct current (DC) and alternating current (AC) to adjust the magnetic field;
   maneuvering, by the first satellite, a second satellite via the magnetic field; and
   sensing, by at least one sensor in the first satellite, a distance between the first satellite and the second satellite and/or a rate of approach or departure of the second satellite relative to the first satellite, wherein the distance and/or rate of approach or departure is estimated based on detected phase shifts, frequency shifts, and/or magnitude changes in the magnetic field.

2. The method of claim 1, wherein the first satellite is a rescue satellite, and the second satellite is a target satellite.

3. The method of claim 1, wherein the current source applies AC current at a frequency selected to maneuver the second satellite relative to the first satellite.

4. The method of claim 3, wherein the current source comprises a variable current source.

5. The method of claim 1, wherein the controlling the current source comprises controlling, by the control system in the first satellite, the current source to switch between a first AC frequency and a second AC frequency to adjust the magnetic field.

6. The method of claim 1, wherein the second satellite comprises a ferromagnetic or ferrimagnetic material, and
   wherein the maneuvering of the second satellite comprises attracting the second satellite to the first satellite.

7. The method of claim 1, wherein the second satellite comprises a conductive material, and
   wherein the maneuvering of the second satellite comprises repelling the second satellite away from the first satellite.

8. The method of claim 1, wherein the second satellite comprises a ferromagnetic or ferrimagnetic material and a conductive material, and
   wherein the maneuvering comprises attracting the second satellite to the first satellite or repelling the second satellite away from the first satellite.

9. The method of claim 1, wherein the method further comprises controlling, by the control system in the first satellite, the current source in the first satellite based on sensor information obtained from at least one sensor in the first satellite.

10. The method of claim 1, wherein the electromagnet comprises a torque rod, an electric motor coil, and/or a solar array.

11. The method of claim 1, wherein the second satellite comprises a second electromagnet.

12. The method of claim 11, wherein the method further comprises:
   applying, by a second current source in the second satellite, a second current to the second electromagnet in the second satellite;

generating, by the second electromagnet in the second satellite in response to the second current, a second magnetic field; and maneuvering, by the second satellite, the first satellite via the second magnetic field.

13. The method of claim 12, wherein the current of the first satellite and the second current of the second satellite are applied at a same frequency or at orthogonal frequencies.

14. The method of claim 12, wherein the maneuvering of the second satellite and/or of the first satellite comprises attracting the second satellite to the first satellite, attracting the first satellite to the second satellite, repelling the second satellite away from the first satellite, repelling the first satellite away from the second satellite, inducing a relative motion between the first satellite and the second satellite, and/or inducing a constant relative orientation between the first satellite and the second satellite.

15. A system for maneuvering satellites, the system comprising:
 a first satellite and a second satellite to be maneuvered by the first satellite via a magnetic field,
 wherein the first satellite comprises:
  a current source to apply current to an electromagnet, the electromagnet to generate the magnetic field in response to the current,
  a control system to control the current source to switch between direct current (DC) and alternating current (AC) to adjust the magnetic field, and
  at least one sensor to sense a distance between the first satellite and the second satellite and/or a rate of approach or departure of the second satellite relative to the first satellite, wherein the distance and/or rate of approach or departure is estimated based on detected phase shifts, frequency shifts, and/or magnitude changes in the magnetic field.

16. The system of claim 15, wherein the second satellite comprises a ferromagnetic or ferrimagnetic material, and
 wherein the second satellite is maneuvered by attracting the second satellite to the first satellite.

17. The system of claim 15, wherein the second satellite comprises a conductive material, and
 wherein the second satellite is maneuvered by repelling the second satellite away from the first satellite.

18. The system of claim 15, wherein the second satellite comprises a ferromagnetic or ferrimagnetic material and a conductive material, and
 wherein the second satellite is maneuvered by attracting the second satellite to the first satellite or repelling the second satellite away from the first satellite.

19. The system of claim 15, wherein the control system controls the current source to switch between a first AC frequency and a second AC frequency to adjust the magnetic field.

20. The system of claim 15, wherein control system controls the current source based on sensor information obtained from the at least one sensor.

* * * * *